J. H. TROWBRIDGE.
Machines for Packing, Wrapping, and Labeling Tobacco.

No. 143,545. Patented Oct. 7, 1873.

WITNESSES.

J. H. TROWBRIDGE.
Machines for Packing, Wrapping, and Labeling Tobacco.

No. 143,545. Patented Oct. 7, 1873.

WITNESSES. Harry Smith
Thomas McIlvain

J. H. Trowbridge
By his Atty
Harrison & Huy

J. H. TROWBRIDGE.
Machines for Packing, Wrapping, and Labeling Tobacco.

No. 143,545. Patented Oct. 7, 1873.

WITNESSES. Harry Smith
Thomas McSwain

J. H. Trowbridge
By his Attys
Howson & Son

AM. PHOTO-LITHOGRAPHIC CO. N.Y. (OSBORNE'S PROCESS)

UNITED STATES PATENT OFFICE.

JOHN H. TROWBRIDGE, OF NEW HAVEN, CONNECTICUT.

IMPROVEMENT IN MACHINES FOR PACKING, WRAPPING, AND LABELING TOBACCO.

Specification forming part of Letters Patent No. 143,545, dated October 7, 1873; application filed October 8, 1872.

*To all whom it may concern:*

Be it known that I, JOHN H. TROWBRIDGE, of New Haven, county of New Haven, State of Connecticut, have invented a Machine for Packing Tobacco and other Substances into Wrappers, and for Printing and Stamping the said Wrappers, of which the following is a specification:

My invention consists of certain improvements in and additions to the machine for packing fine-cut tobacco and other substances into wrappers for which Letters Patent were granted to me on the 1st day of February, A. D. 1870; and the object of my invention is similar to that described in said patent—namely, to enable fine-cut tobacco and other substances to be measured, fed, and packed into printed, or printed and stamped, wrappers, which may be printed, cut, and fed by mechanism co-operating with the packing mechanism by a continuous automatic operation, the packages to be of any desired shape, and exact and even as regards the quantity and weight of the material packed.

Figure 1:
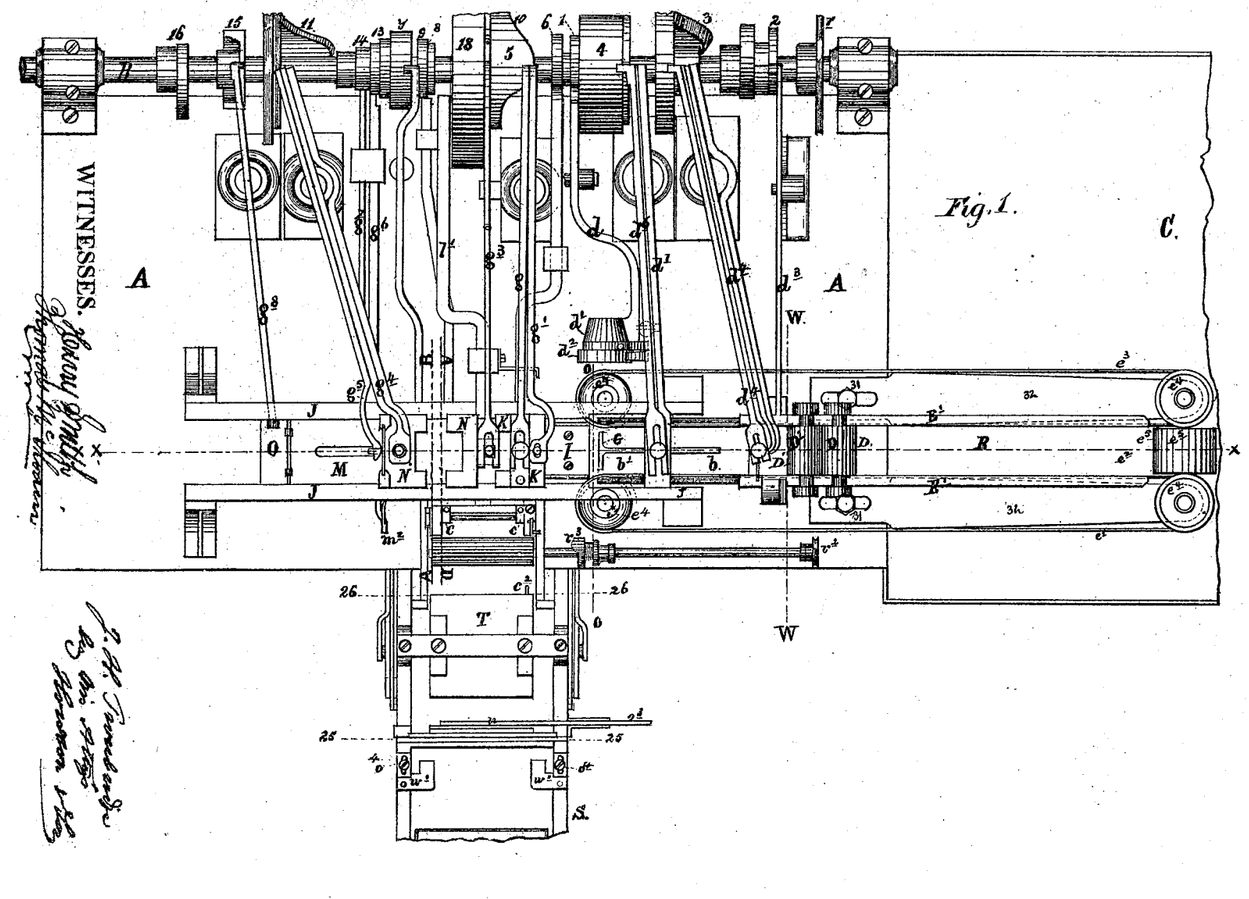
Figure 1, Sheet A, is a plan or top view of a machine embodying my invention.
Figure 2:
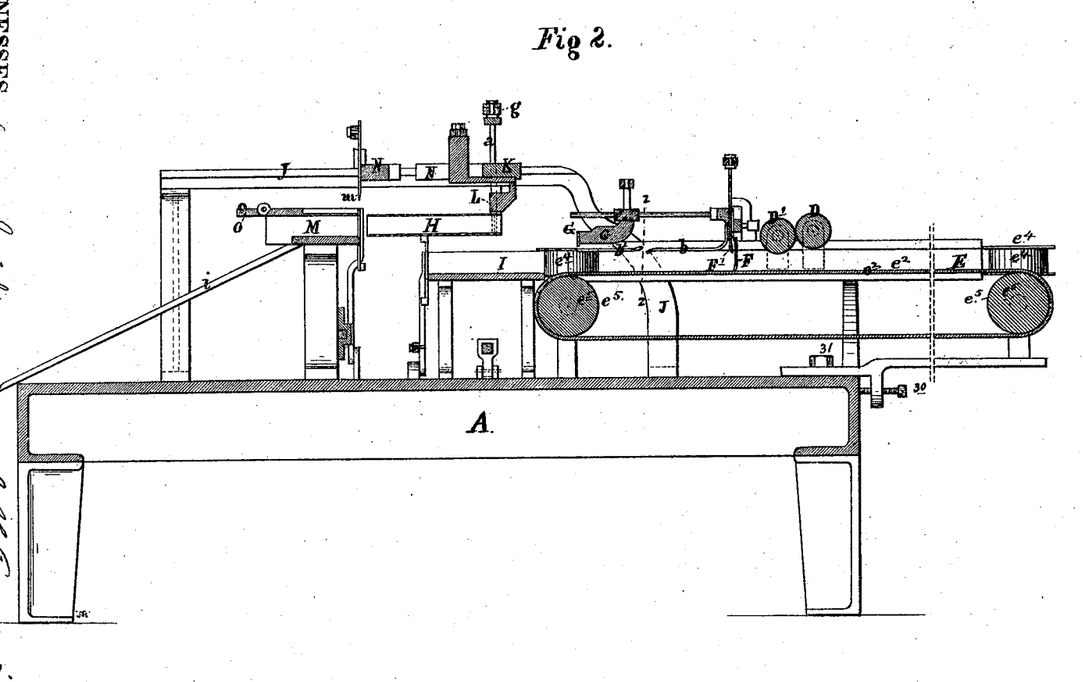
Fig. 2, Sheet B, a sectional elevation of the same on the line $x$ $x$, Fig. 1.
Figure 3:
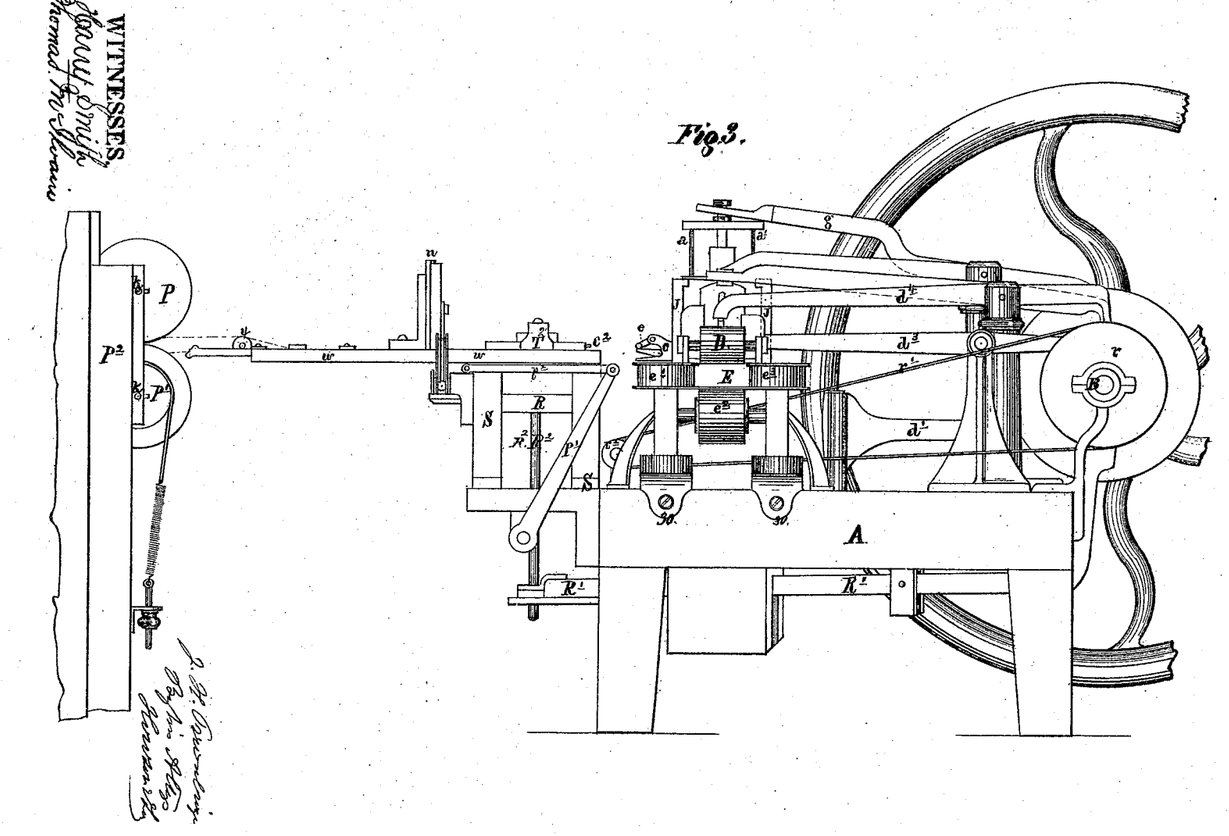
Fig. 3, Sheet C, an end elevation of the machine.
Figure 9:
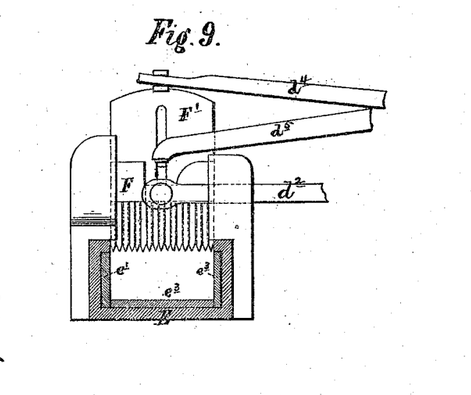
Fig. 9, Sheet E, an enlarged transverse section of the carrying and feeding trough with the measuring-combs, taken on the line W W, Fig. 1.

A is the frame or bed of the machine, which may be fastened to a bench or stand in any suitable manner. In bearings at one side of this frame turns the main driving or crank shaft B, which is provided at one end with a suitable driving pulley or pulleys. A table, C, for receiving a quantity of tobacco to be fed to the machine, is securely attached to one end of the bed A. Extending partly over this table, and parallel with the shaft B, is a carrying-trough, E, composed of a flange-box, E', open at the top, and of three endless belts or bands, $e^1$, $e^2$, and $e^3$. These endless belts or bands may be made of leather, cloth, or rubber. They are arranged to operate within the flange-box E', as shown in Fig. 9, and are passed around pulleys $e^4$ $e^4$ $e^4$ $e^4$ and $e^5$ $e^5$. The latter are geared together, as best observed in Fig. 1, and derive their motion from a cam, 1, on the main shaft, through the medium of a lever, $d$, rack $d^1$, and cog-wheel $d^2$. The pulleys are turned and the endless bands moved forward a given distance at each revolution of the main shaft, the extent of this movement being determined by the lever and rack, made adjustable for the purpose. During the reverse motion of the rack $d^1$ and cog-wheel $d^2$, the carrying-belts are held at rest and in place by a pawl and ratchet. The belts forming the carrying-trough can be readily tightened when they become loose by means of set-screws 30, Figs. 2 and 3; and, after tightening, they can be held in place by nuts 31, which slide in a groove in the movable bed 32, to which are secured the bearings of the pulleys $e^4$ $e^4$ and $e^5$, at the right-hand end of the carrying-trough. The nuts 31 also serve to fasten the adjustable bed firmly to the bed of the machine. Two rollers, D and D', are arranged above and extend slightly into the carrying-trough, as shown in Figs. 1 and 2, for the purpose described hereafter. Adjacent to these rollers are two combs or separators, F and F', Figs. 2 and 9, operating as hereafter described, to separate and measure the quantity of tobacco to be placed in each package. The comb or separator F has simply a rising-and-falling motion on the carrying-trough E, which motion is imparted by the cam 2 on the main shaft, through the medium of a lever, $d^3$, to which the comb is affixed, and the latter is securely held in position by ways or guides attached to the flange-box E'. The comb F' has also a falling motion in the carrying-trough in the same time as the comb F, this motion being imparted to it by a cam, 3, on the main shaft and lever $d^5$, Fig. 1. The comb F' has also a forward motion through the trough to the position shown by the line z z in Fig. 2, imparted by the same cam 3 and a lever, $d^4$; and after reaching this point the said comb is lifted and carried back to its original position by the said cam and levers. A slide or cover, $b$, of the entire width of the carrying-trough, and arranged directly above the latter, is secured to the carriage of the comb F', and moves forward with the same, passing beneath a stationary cover, $b'$, which is rigidly and permanently attached to the top of the flange-box E'. (See Fig. 2.) At the front end of the carrying-trough E, and on line with the same, is a folding-bed, I, Figs. 2, 4, and 6, open at the top and at its opposite ends, and adapted for the reception of a forming-case, H, which, as hereafter described, receives the charge of tobacco from the carrying-trough. This case H is a device for giving form to the package of tobacco, and is of the same size as the said package, except that it is of somewhat greater length. It is constructed of very thin yet strong sheet-brass or other metal; is open at both ends, and is held in position to receive the charge of tobacco from the carrying-trough by means of vertical rods $a\ a'$. (See Figs. 2, 3, 4, and 5.) These rods $a\ a'$ pass through a carrier, K, which slides on guide-frames J J secured to the bed of the machine; and the said rods have a vertical sliding movement through this carrier, imparted to them by a lever, $g$, and cam 5 on the main shaft. The carrier K has also a sliding movement imparted to it by the same cam 5 and a lever, $g^1$, sufficient to wholly or partially introduce the elevated forming-case H into a fixed receiving-box, M, as hereafter described.

Figure 7:
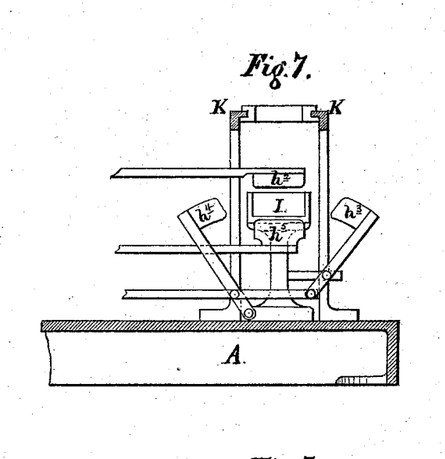
Fig. 7, Sheet D, a transverse section on the line A D, Fig. 1, showing the knives for folding the wrappers at one end.

In addition to the above parts of the machine proper, there are two plungers, G and L, and two sets of folding-blades, $h, h^1, h^2, h^3, h^4,$ and $h^5$, and $m, m^1, m^2,$ and $m^3$, arranged close to the adjacent ends of the folding-plate I and receiving-box M, and operated by levers and cams on the main shaft, in the manner hereafter described. (See Figs. 2, 7, and 8.) The plunger G is arranged above the carrying-trough E, so as to be dropped into the latter, between the plates $b$ and $b'$, by the action of a lever, $d^6$, and cam 4 on the main shaft, and so as also to be moved forward through the said trough and into the case H by the same cam and a lever, $d^7$, and be afterward raised and retracted to its first position, passing over the plate $b'$ during the latter movement. (See Figs. 1 and 2.) The plates or covers $b$ and $b'$ have central longitudinal openings for the admission and passage of the operating-arm of the plunger G, and the receiving and forming case H has also a narrow longitudinal slit at the top, extending throughout its entire length, for the passage of the operating-arms of both of the plungers G and L. The plunger L, Fig. 2, is arranged to be depressed to a position in line with the rear end of the case H by the action of a cam, 10, on a lever, $g^3$, and to be moved forward through the said case by the action of a cam, 11, and lever $q^4$ on a carrier, N, adapted to the guides J, and to which the said plunger is attached, the latter, by these movements, forcing the tobacco from the case H into the box M, and compressing it in the latter, as hereafter described.

The operation of the above-described portion of the machine is as follows: A quantity of tobacco is deposited upon the table C, and is fed by hand into the carrying-trough E, which the attendant keeps evenly filled, and by which the tobacco is carried forward at stated intervals to the separating, measuring, and forming devices.

In place of the table C, the hopper and feeding device described and shown in my aforesaid Letters Patent of February 1, 1870, may be used; but I prefer in the present instance to feed the tobacco by hand, as above described.

At each revolution of the cam-shaft the carrier-trough is moved forward, by the devices before described, the length of a package of tobacco, or to such a distance as may be necessary to obtain the quantity of tobacco desired; but the said trough remains at rest during the reverse movement of the operating devices.

The trough E, besides serving as a carrier, is also a medium for measuring the tobacco, as the carrying space within the belts is only large enough to receive the quantity of tobacco desired in a package, which, when separated at stated and regular intervals, will give the exact amount in weight required in each package.

Figure 4:
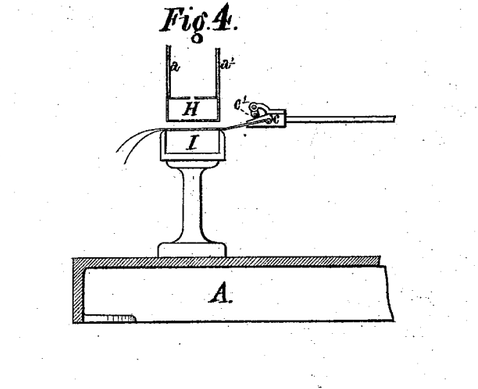
Figs. 4 and 5, Sheet D, transverse sections of the machine, showing the wrappers in position for folding, and partially folded.
Figure 5:
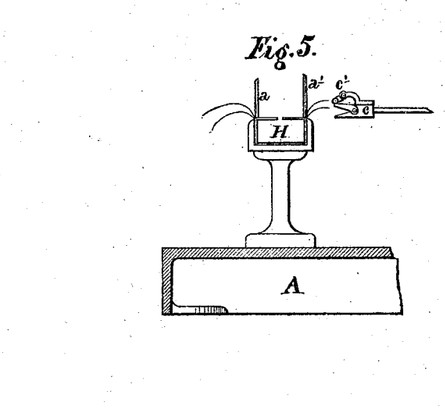
Figure 6:
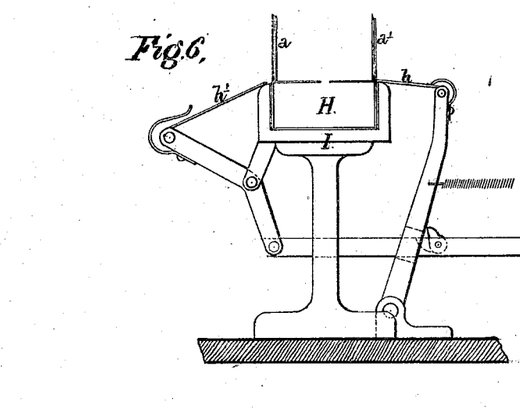
Fig. 6, Sheet E, a transverse section on the line $o$ $o$, Fig. 1, drawn to an enlarged scale, and showing the knives for forming the top folds of the wrapper.
Figure 8:
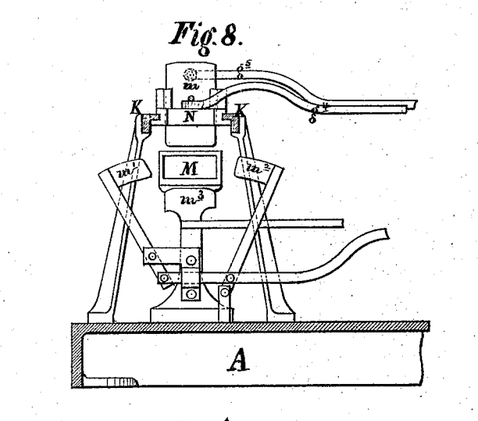
Fig. 8, Sheet D, a transverse section on the line A B, Fig. 1, showing the knives for folding the wrappers at the opposite end.

The tobacco is compressed to the desired density, as it is carried forward in the trough, by passing under the rollers D and D', Fig. 2. An inclined plate or a fourth endless band may be substituted for the rollers; but in packing tobacco the latter have proved sufficient and are preferable. In either case the reduction of the mass is effected more gradually than when a single roller is used, as heretofore. The combs F and F' serve to separate and measure the tobacco, and are both depressed simultaneously and pass through the tobacco to the bottom of the carrying-trough. The comb F' is then caused to move forward, and pushes a quantity of the tobacco (sufficient to make a package of the required size) before it to the point indicated by the line $z\,z$ in Fig. 2. During this movement of the comb F' the covers $b$ and $b'$ prevent the tobacco from escaping above the top of the carrying-trough. After reaching the point Z the comb F' is lifted from the trough and returned to its former position, and the comb F, which has held back the tobacco in the carrying-trough from that separated and carried forward by the comb F', is then raised to its first position, and the carrying-trough moves forward, carrying a fresh supply of tobacco. The carrying-trough at this point also moves forward the charge of tobacco previously separated and carried forward by the comb F', and partially delivers the same into the receiving and forming case H, now contained within the folding-bed I, in line with the carrying-trough, and with its top flush with the upper edges of the said folding-bed. Prior to the above movement, and while the receiving and forming case H was elevated, as shown in Figs. 2 and 4, a sheet of printed foil and a sheet of paper to form a wrapper for the tobacco were drawn from a printing-press, arranged at one side of the machine and fully described hereafter, by sliding nippers $c\,c$, operated by a bar, $l$, and cam 18 on the main shaft, and were carried by the said nippers across the top of the folding-bed I, as shown in Fig. 4, and deposited thereon in a position ready for folding. The jaws of the nippers were then permitted to spring open, so as to release the wrapper-sheets, owing to the striking and lifting of a small retaining-arm, $c^1$, on the nippers by a fixed stud on the machine. (See Fig. 5.) The receiving and forming case H was then, by action of its lever $g$ and the cam 5, dropped into the folding-bed I, carrying with it and depressing the wrapper-sheets previously deposited on the said folding-bed, this forming the bottom and side folds of the wrapper, as plainly shown in Fig. 5. The folding-knives $h$ and $h^1$ (see Fig. 6) then, in turn, completed the top folds, by carrying down onto the top of the receiving and forming case the sides of the wrapper-sheets left projecting above the case and bed I, as shown in Fig. 6. The folding-knife $h^2$, Fig. 7, then descended and made the first end fold; the knives $h^3$ and $h^4$ next formed the side folds, and the knife $h^5$ then turned up the lower or last end fold, and thus completed the folding of the front or left-hand end of the package. These several folding-knives are operated in the proper time by the action of cams 6, 7, 8, and 9 on the levers to which the knives are attached. After thus lowering the forming-case, folding the wrapper over the same, and partly inserting the charge of tobacco, as before described, the plunger G is, by action of its cam and lever $d^6$, dropped into the carrying-trough at the rear of the charge of tobacco, passing downward between the covers $b$ and $b'$. The said plunger is then given a forward movement by the lever $d^7$, and forces the entire charge of tobacco into the case H, and, after performing this duty, is lifted and retracted to its original position. During the above movements of the folding-knives and plunger G the carrying-trough remains at rest. While the charge of tobacco is passing into the forming-case the folding-knife $h^1$, Fig. 6, remains in position on top of the case, holding the wrapper-sheet firmly and smoothly, and the folding-knife $h^5$ also remains in position after folding the sheet at the end of the case, until the plunger G has finished the delivery of the charge of tobacco and is retracted. The wrapper-sheets being now folded about the forming-case and at one end, and the charge of tobacco introduced into the case from the carrying-trough, as before described, the forming-case, with its contents and wrapper, is lifted from the bed I by the action of the cam 5 and lever $g$, and is then, with the carriage $k$, and by the same cam and the lever $g^1$, carried forward to a position opposite the hollow receiving-box M, as seen plainly in Fig. 2. As soon as the case H has been moved to this position at the rear of the box M, the plunger L is, by action of the cam 10 on its lever $g^3$, dropped into position behind the said case. The carrier N, which carries the plunger, is then moved forward by means of its lever and cam, causing the said plunger to enter the rear or right-hand end of the case, this forward movement being continued until the plunger passes entirely through the case, and forces from the same the charge of tobacco, as well as the wrapper folded on the outside of the said case. As the plunger moves forward the forming-case H commences the return movement, and thus assists the plunger in delivering the wrapper and its contents to the box M. As the partially-completed package is thus forced from the forming-case H, it enters the box M, and is compressed to any desired degree within the latter by the plunger L, the extent of the movement of the latter being made adjustable for this purpose. The plunger is then retracted to its first position, leaving the rear or open end of the package projecting from the box M, and in a position ready for folding. The folding-knife $m$, Figs. 2 and 8, is attached to the carriage N of the plunger L, and moves back as the latter is retracted, until it reaches a position directly over the rear end of the box M. It is then, by action of the cam 12 on the lever $g^5$, lowered down past the end of the said box M, carrying with it the projecting ends of the wrapper, it being then moved laterally close up to the end of the box. This knife $m$ should be made of very thin sheet-steel, as the other three folds of the wrapper are folded and shaped upon it. After the lowering of the knife $m$, the knives $m^1$ and $m^2$, Fig. 8, form the side folds, and at once retract to their original positions, the knife $m^3$ then turning up the last end fold, and being with the knife $m$ withdrawn, this completing the package. The last folding operations are shown plainly in Fig. 8, the knife $m$ being operated as before described, and the knives $m^1$, $m^2$, and $m^3$, by cams 13 and 14, acting on connecting-levers $g^6$ and $g^7$. The front or left-hand end of the box M is provided with a door, $o$, which is opened by a cam, 15, and lever $g^6$, when the completed package is being forced out of the box by the entrance of a succeeding package. As soon as the completed package drops from the box M, this door closes quickly and prevents the front folded end of the second package from being unfolded during the operation of compressing the tobacco in the box M. As the completed packages are forced from the box they are received in the trough $i$, and carried into any suitable receptacle.

I propose in some instances to carry the forming-case H entirely into the box M, for the purpose of insuring a safe passage through the latter of the wrapper-sheets, even when no charge of tobacco has been forced into the receiving-case. This arrangement would also enable a charge of tobacco to be conducted safely into the box M in case no wrapper-sheet had been fed to the folding devices.

As another modification of my invention, it may be mentioned that plain knives or blades could be substituted for the combs F and F' in the carrying-trough; but I prefer to employ the latter, as they detach and separate the tobacco without cutting the fibers.

I will now proceed to describe the mechanism for printing, stamping, and cutting into appropriate lengths the sheets of paper and foil to be fed to the machine as wrappers for the packages. A frame, S, is secured to the bed of the machine, at a point directly opposite the folding-bed I; and to the outer end of this frame, or to a post, $P^2$, secured to the floor, are hung two rollers, P and $P^1$, the uppermost of which carries a roll of paper, and the lowermost a roll of foil. A stationary table, $w$, is secured to the frame S adjacent to the rolls P and $P^1$, and above this table is a roller, $x$. (See Figs. 10, 11, and 14.)

Figures 10, 15, 16:
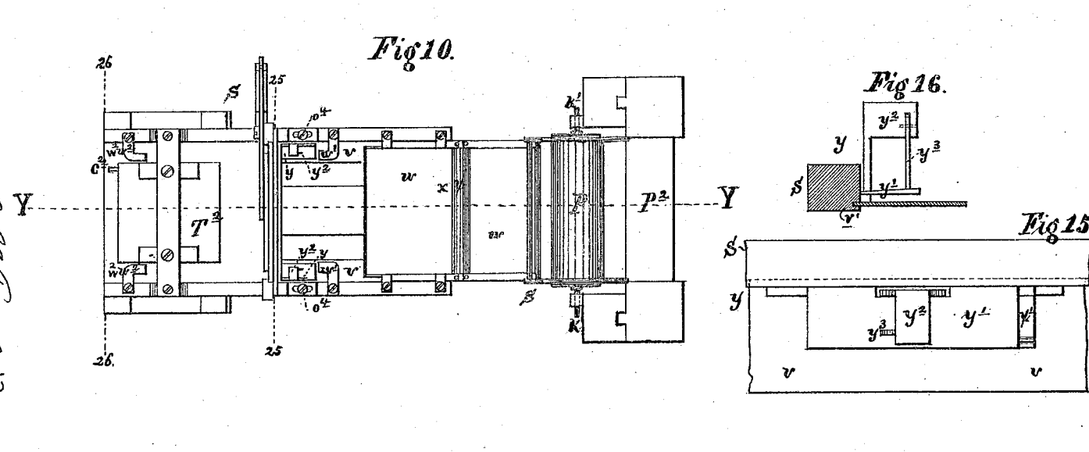
Fig. 10, Sheet E, a plan view of the printing-press, wrapper-sheet-feeding device, and cutting-knives.
Figs. 15 and 16, Sheet E, detached views, drawn to an enlarged scale, of the device for delivering the sheets for wrappers to the printing-press.
Figures 11, 14, 17:
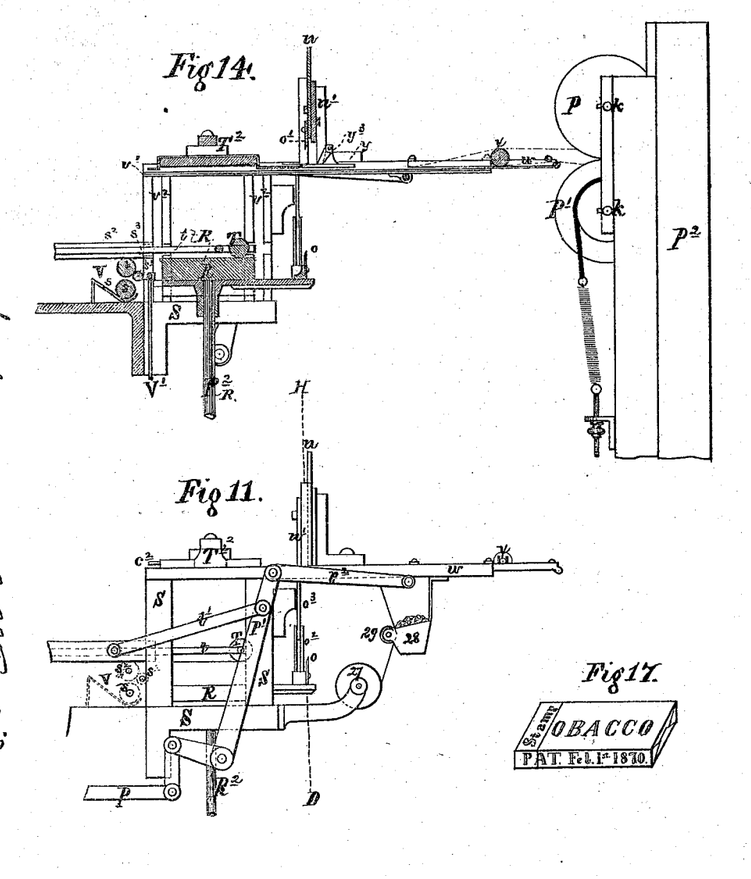
Fig. 11, Sheet F, an elevation of the same, showing the device for supplying the revenue-stamps.
Fig. 14, Sheet F, a longitudinal sectional elevation on the line Y Y, Fig. 11.
Fig. 17, Sheet F, a perspective view of the complete printed and stamped package as it appears when discharged from the machine.
Figure 12:
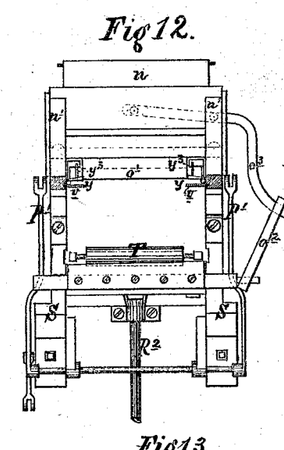
Fig. 12, Sheet F, a transverse sectional elevation of Fig. 11 on the line D H.
Figure 13:
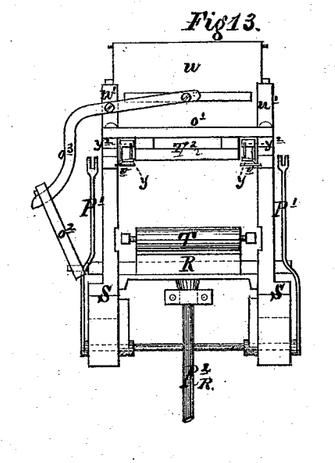
Fig. 13, Sheet F, a transverse section of Fig. 11 on the line D H, viewed from a side opposite that shown in Fig. 12.

A sliding table, $v$, adapted to grooves $v^1$ in the opposite sides of the frame S, has a reciprocating movement imparted to it by a cam, 16, on the main shaft, through the medium of levers and connecting-rods $p$, $p^1$, and $p^2$, Fig. 11; and at the opposite sides of the front end of this sliding table are two clamps or carriers, $y$ $y$, each composed, as shown in Figs. 15 and 16, of a clamping-piece, $y^1$, hung to the table in a manner similar to a hinge, and held upon or free from contact with the table by a spring, $x'$. Attached to the table above each clamp $y^1$ is an overhanging standard, $y^2$, from which hangs loosely a V-shaped lever, $y^3$, the latter being acted on, as hereafter described, by fixed projections, $w^1$ and $w^2$, of the frame S, so as to alternately force the clamps $y^1$ down to the sliding table and release the said clamps. The sliding table $v$, in its rearward movement, extends partially beneath the table $w$, and at the extremity of its forward movement reaches the line 26 26, Figs. 1 and 10, passing beneath a platen, $T^2$, of the form best observed in Fig. 10, and secured to the frame S. There is an opening in the table $v$ of the size of the platen, and directly beneath the latter is arranged the bed R, to which the type or engraved plate from which the impression is to be made is affixed. This bed has a rising-and-falling motion in guides $v^2$ of the frame S, imparted to it by a cam on the main shaft, through the medium of a lever, $R^1$, and connecting-rod $R^2$. (See Fig. 3.) T, Fig. 14, is the inking-roll, moved backward and forward across the type by a slide, $t$, and lever $t'$, attached to the arm $p^1$ of the sliding table $v$. This inking-roll is furnished with ink from a fountain, V, from which the ink is taken by a metal roll, $s$, revolved by devices not shown in the drawing, actuated by the bed R as the latter descends after giving an impression. This roll is adjustable vertically, so as to regulate the quantity of ink taken up by it. A small soft roll, $s^1$, which has a rising-and-falling motion imparted by a rod, V', transfers the ink from the roll $s$ to the distributing-roll $s^2$, and the latter, while in contact with the roll $s^1$, is rapidly revolved by means of a pulley, $r$, on the main shaft, belt $r^1$, and small pulley $r^2$. (See Fig. 3.) It is also reciprocated longitudinally by means of a cam. In this way the ink is evenly and thoroughly distributed upon the roll $s^2$, and while the latter is revolving the inking-roller T is carried against it and takes up its quota of ink. These inking devices resemble, and may be precisely the same as, those in ordinary use for printing purposes. Attached to the type-bed R, and rising and falling with the same, is the lower cutting-knife $o$. The upper cutting-knife $o^1$ is attached to a slide, $n$, adapted to and sliding in standards $n'$ secured to the frame S, and rendered adjustable on the said frame by set-screws $c^4$, Fig. 10. The upper knife $c^1$ rises and falls by motion imparted from the bed R, a link, $o^2$, and lever $o^3$, Figs. 12 and 14, the said knife rising high enough to permit the passage beneath it of the standards $y^2$ $y^2$ of the sliding table $v$.

The operation of the printing-press and cutters is as follows: The sheets of paper and foil from the rollers P and $P^1$ are carried forward on the stationary table $w$, the foil passing under and the paper over the roller $x$, to the position indicated by the line 25 25 in Figs. 1 and 10. The ends of the sheets are then seized firmly by the clamps or carriers $y$, closed upon them by means of the projections $w^1$ of the fixed frame S on the rearward motion of the table. The sliding table is now given a forward motion, passing between the cutting-knives and under the platen $T^2$, until it reaches the point indicated by the line 26 26 in Fig. 10. The levers $y^1$ of the carriers then come in contact with the projections $w^2$, thus raising the clamps and releasing the sheets, leaving the latter in a position ready for cutting and printing. The bed R, with the type, now rises, passing through the opening formed for it in the sliding table, and gives the desired impression to the foil. The sheets are held firmly between the sliding table and the platen during the printing operation, thus preventing the sheets from being disarranged or adhering to the type or plate as it falls after making the impression. As the bed R rises to print the sheets it carries up the knife $o$, while the knife $o^1$ falls to meet it, the said knives cutting the sheets at the same instant the impression is made. As the bed falls, the knives separate to permit the sliding table to return for the succeeding sheets, the said table having a transverse opening cut in it for the passage of the knives. As soon as the printing is completed, and the sheets are cut and detached, as before described, and before the sliding table retreats, the jaws or nippers $c\ c$, Fig. 1, are moved forward by the action of the cam 18 and lever $t'$, and seize upon the printed sheets, the jaws of the nippers being closed upon the latter by the striking of the wedges $c^1$ against the studs $c^2$ of the frame S. The nippers, after having thus seized the sheets, are retracted, drawing the latter across and depositing them upon the folding-bed I, as before described.

The paper revenue-stamps, now required by law to be affixed to every package of tobacco, are coiled upon a roller on the frame S, as shown at 27 in Fig. 11, and are passed up through a cup, 28, and over a roller, 29. The cup 28 contains a dampened sponge, against which the adhesive or gummed sides of the stamps are pressed in passing; or gum may be brushed or otherwise spread upon the backs of the stamps in passing through the cup. From the roller 29 the stamps are delivered through proper guides in the stationary table $w$ to the sliding table $v$ and carriers $y$, and are carried forward to the printing-press in the same manner and at the same time as the wrapper-sheets. The stamp is then canceled by printing, cut, and detached from the roll at the same time and by the same devices employed to print and cut the wrapper-sheets.

The pressure applied in printing serves to make the stamp adhere fast to the wrapper-sheet, so that it may be carried to the folding device and folded with the wrapper-sheets.

The package, after being completed, presents the appearance shown in Fig. 17, the stamp being folded entirely around the package at one end of the same.

Instead of feeding in and printing the wrapper-sheets and stamps, as above described, the foil sheets, printed and bronzed, with stamps as at present arranged, may be fed to the nippers $c\ c$ from a table, and singly, as in printing-presses; or they may be picked up singly from a pile by any of the ordinary and well-known processes, or by the devices already shown in the Letters Patent granted to me.

If the printed foil is supplied in single sheets, the paper for the inner wrapper may be fed in from a roll and cut, as described.

It is my intention to apply, in some cases, a device for bronzing to the printing-press before described.

The machine, taken as a whole, and constructed as above described, is adapted to the automatic packing of fine-cut, smoking, or chewing tobacco into metal and paper wrappers, one or both, and requires but one attendant, whose duty it is to keep the machine supplied with the tobacco to be packed.

The machine, however, is not confined to the packing of tobacco only, as by slight modifications it may be made to pack any other substance in a powdered, granulated, or finely-divided state, such as tea, coffee, starch, or other article, the merchantable condition of which is a parcel or package.

The entire machine is constructed in a compact and simple form; and the packages produced are perfect in shape, and exact, even as regards the quantity and weight of the material packed.

I claim—

1. The combination of the endless-band carrying-trough and flange-box E' with rollers D and D', or their equivalents, by which the tobacco or other material may be packed into the said carrying-trough to a uniform depth.

2. The knife or comb F' and plate $b$, having such a motion imparted to them that they will convey the measured tobacco or other material beneath the plate $b'$, and, returning, leave the tobacco beneath the said plate.

3. The combination of the carrying-trough and plate $b'$ with the plunger G, having such horizontal and vertical movements imparted to it that it will descend into the feeding-trough and force the measured tobacco from beneath the plate $b'$, all substantially as set forth.

4. The combination of the traversing feeding-trough, plate $b'$, and receiver H, into which the tobacco or other material is forced by the plunger G.

5. The folding-knife $m$, operating substantially in the manner described, in respect to the remaining folders $m^1$, $m^2$, and $m^3$.

6. The combination of the receiving-box M with the hinged door O.

7. The combination, substantially as herein described, with a machine for packing tobacco and other material, of a printing-press, whereby the required impression or impressions may be imprinted on the wrappers before the latter are fed to the packing-machine.

8. The combination, in a packing-machine, of the packing mechanism described, or its equivalent, and a machine whereby continuous strips of paper and foil are brought together, printed, cut, and fed to the folding mechanism, as set forth.

In testimony whereof I have signed my name to this specification in the presence of two subscribing witnesses.

JOHN H. TROWBRIDGE.

Witnesses:
A. L. MUNSON,
EDGAR CARY.